Aug. 12, 1952 J. W. BRYCE 2,606,484

NEON DRUM RECORDING DEVICE

Filed Aug. 13, 1949 4 Sheets-Sheet 1

INVENTOR.
JAMES W. BRYCE, DEC'D, BY
ELIZABETH SNOW BRYCE, AND THE
NATIONAL NEWARK & ESSEX BANKING
CO. OF NEWARK, EXECUTORS
BY Robert S. Dunham
ATTORNEY Aug. 12, 1952 J. W. BRYCE 2,606,484

NEON DRUM RECORDING DEVICE

Filed Aug. 13, 1949 4 Sheets-Sheet 2

INVENTOR.
JAMES W. BRYCE, DEC'D, BY
ELIZABETH SNOW BRYCE, AND
THE NATIONAL NEWARK &
ESSEX BANKING CO. OF
NEWARK, EXECUTORS
BY Robert S. Dunham
ATTORNEY

Aug. 12, 1952 J. W. BRYCE 2,606,484

NEON DRUM RECORDING DEVICE

Filed Aug. 13, 1949 4 Sheets-Sheet 3

INVENTOR.
JAMES W. BRYCE, DEC'D, BY
ELIZABETH SNOW BRYCE, AND THE
NATIONAL NEWARK & ESSEX BANKING
CO. OF NEWARK, EXECUTORS

BY Robert S. Dunham
ATTORNEY

Aug. 12, 1952 J. W. BRYCE 2,606,484

NEON DRUM RECORDING DEVICE

Filed Aug. 13, 1949 4 Sheets-Sheet 4

INVENTOR.
JAMES W. BRYCE, DEC'D, BY
ELIZABETH SNOW BRYCE, AND THE
NATIONAL NEWARK & ESSEX BANKING
CO. OF NEWARK, EXECUTORS
BY Robert S. Dunham
ATTORNEY Patented Aug. 12, 1952 2,606,484

UNITED STATES PATENT OFFICE 2,606,484

NEON DRUM RECORDING DEVICE

James W. Bryce, deceased, late of Glen Ridge, N. J., by Elizabeth Snow Bryce, Glen Ridge, N. J., and The National Newark and Essex Banking Company of Newark, Newark, N. J., executors, assignors to International Business Machines Corporation, New York, N. Y., a corporation of New York Application August 13, 1949, Serial No. 110,195

3 Claims. (Cl. 95—4.5)

This invention relates to a photographic recording device.

In the record controlled photographic recording of variable record data, it is at times desirable to record on the recording medium certain fixed data from a source independent of the control record.

It is, therefore, the object of this invention to provide means for the recording of fixed data on a photographic medium independently of or concurrently with the recording of variable data on such medium under the control of record data.

It is another object to provide mechanical and electrical means for recording fixed data on a photographic medium.

It is a further object of the invention to provide manually settable data recording means which may be manually changed from time to time for recording data on a photographic medium.

The objects of the invention are attained by providing in conjunction with a record handling and sensing mechanism through which records such as perforated cards are passed and from which a photographic recording mechanism is controlled, a recording mechanism having means for photographically recording fixed data. The invention is an improvement on the recording device shown in U. S. Patent No. 2,346,251 to James W. Bryce, and consequently this disclosure has many features that are also shown in the patent.

Basically, the recording section includes a camera unit having suitable lens structure through which a photographic film may be exposed as it passes from a feed spool to a take-up spool in synchronization with the passage of record cards or the like through the record handling and sensing section. The recording section includes a rotatable character screen or drum which is opaque, except for columns of characters formed therein through which lamps within the drum are adapted to illuminate the photographic film. The character drum is rotated in synchronism with the passing of a card through the sensing section so that as a perforation in the card is sensed and its corresponding lamp is illuminated, a corresponding drum character is positioned at a trans-illuminating slot in front of the lamp. Each character column in the periphery of the drum has its individual lamp, and the lamps are selectively fired under the control of card perforations.

The improvement herein consists in providing in the recording section means for successively firing certain of the illuminating lamps at selected intervals in accordance with the setting of a manually settable data selecting device. In one form of the invention preselected lamps within the character drum are illuminated at predetermined intervals to transilluminate selected characters in the periphery of the character drum, while in a modified structure an auxiliary lamp is used to transilluminate translucent adjustable data slides in such manner that the transilluminating rays are projected against the recording film.

The manner in which the invention is practiced will appear more particularly as the description thereof proceeds with reference to the drawings forming a part of this application and in which drawings.

Figure 7:
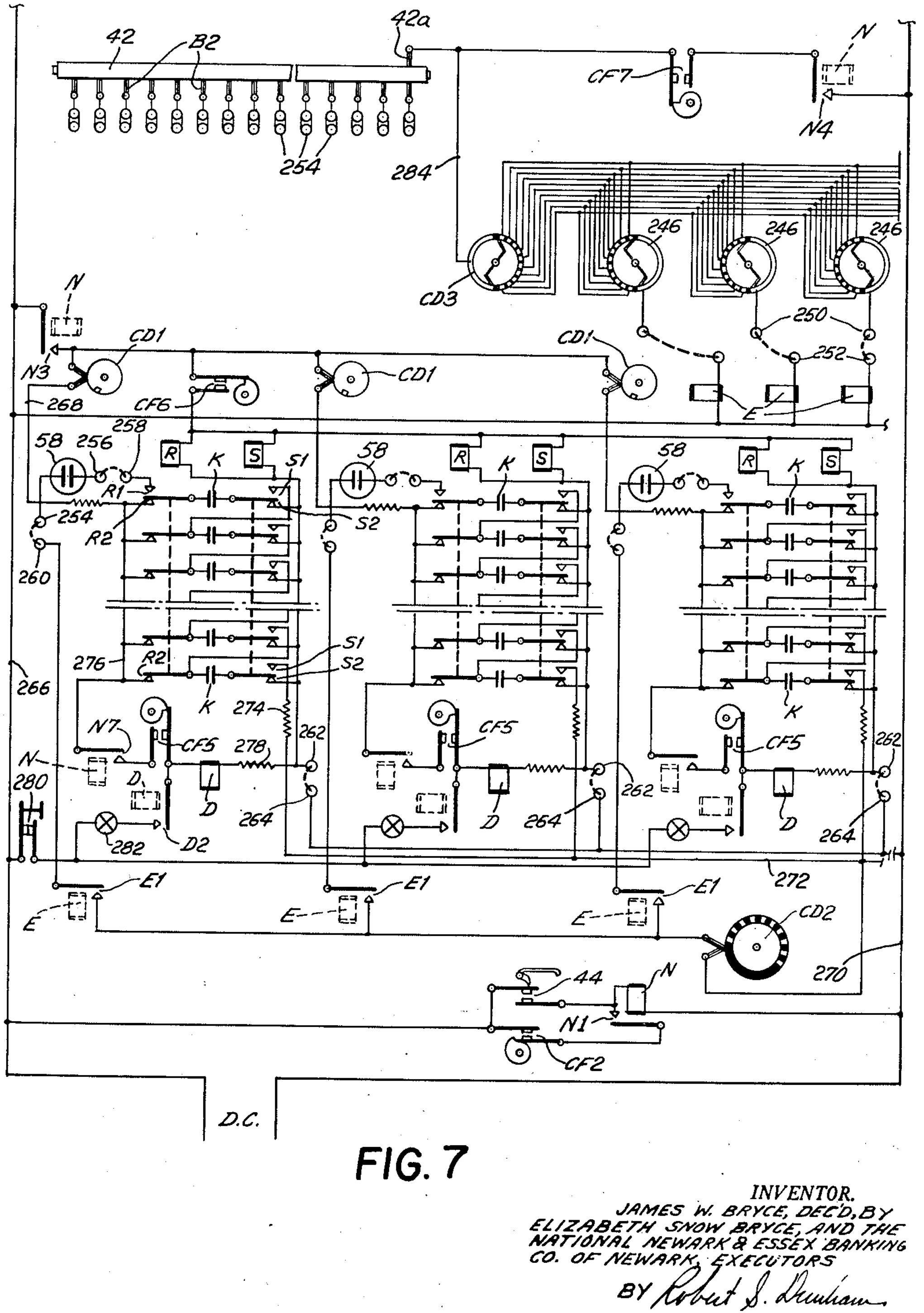
Fig. 7 is a wiring diagram showing the manner in which the recording operation is controlled by manually settable data retaining devices of Fig. 6.

The machine in general comprises a record handling and reading section 10, and a recording section 12. Suitable shafting connects the recording section, and the record handling and reading section, whereby the operative devices of the respective sections may be driven in synchronism by a motor 14. The motor 14 through conventional worm gearing and shafts is adapted to drive a main drive shaft 16. The drive shaft 16 directly drives parts in the recording section, as will be subsequently described. It also has fixed thereto a plurality of so-called CF cams, specifically herein referred to as the cams CF-2, CF-5 and CF-6. Attached to the shaft 16 is a gear 18 which drives a gear 20. Fixed to the gear 20 is a one-revolution clutch mechanism 22 which is freely rotatable on a shaft 24. A clutch dog 26 is pivoted to an arm 28 which is fixed to the shaft 24. The clutch dog 26 is adapted to be tripped into engagement with a notch in the clutch plate 22 upon energization of a card feed clutch magnet 30. Driven by and secured to the shaft 24 are three distributing commutators CD–1. Also attached for rotation with the shaft 24 are commutators CD–2 and CD–3. Gearing 32 transmits drive from the shaft 24 to a main drive shaft 34 of the card handling and sensing section 10. The card handling and sensing section is of customary construction, and it includes a supply hopper 36 and a stacker or discharge hopper 38. The card handling and sensing unit is also provided with driven card feed rolls which are driven by helical gearing 40. Within the card sensing section is a conventional card picker which is adapted to pick cards one at a time from the bottom of a card stack in the hopper 36 and advance such cards into feed rolls, where the cards pass between a contact roller 42 and related sensing brushes B–2 for detecting perforations therein. The cards passing through the card sensing section also come into contact with a card lever having contacts 44. After the cards have been analyzed in the card sensing section, they are discharged into the receiving hopper 38. The contact roll 42, its related sensing brushes B–2 and the card lever operating the contacts 44 are shown in Fig. 7 of the drawing, and their particular disposition in the card sensing section is disclosed in Fig. 7 of the above noted Bryce patent.

The recording unit 12 includes a suitable base 50 which has attached thereto a pair of side plates 52, one of which affords a journal for the end of the drive shaft 16. The drive shaft 16 through suitable gearing is adapted to drive a character screen which is herein shown as a drum 62 in synchronism with the passage of cards through the sensing station 10. The particular manner in which character drum 62 is driven forms no part of this invention and is best seen by reference to the aforementioned Bryce patent. The drum is rendered opaque except the characters formed therein which are transparent or translucent to permit transillumination thereof.

It will be understood that the characters formed in the wall of the drum correspond to the index points of a record card, and disposed within the drum, one in association with each character column, are a plurality of lamps which are herein shown as neon lamps 58. Normally the lamps 58 are not energized, but when it is desired to make a recording, a source of potential is momentarily applied to the appropriate lamp at the instant the desired character in the wall of the drum is in proper registration for recording. The light from the lamp will trans-illuminate the character, and such character will be recorded on the photographic film as will be subsequently explained.

Figure 2:
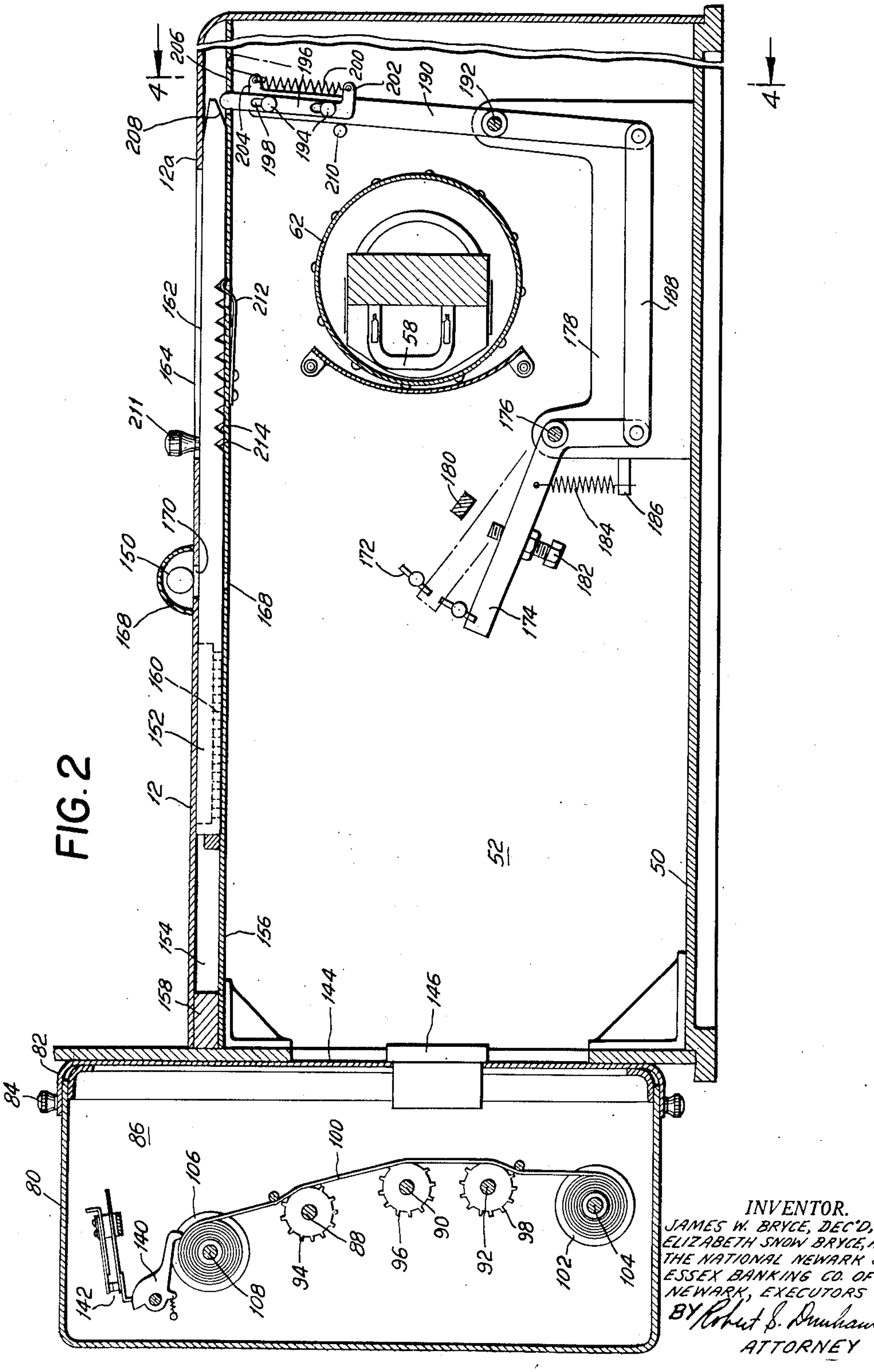
Fig. 2 is a cross-sectional view on line 2—2 of Fig. 1.

Fig. 2 of the drawings more or less schematically illustrates the nature of the camera unit. The unit includes means for supporting film spools and for feeding film past a lens. A camera housing 80 is adapted to fit into flanges 82 attached to one end of the section housing 12. The camera housing may be removably held in position by means of thumb nuts 84. A camera frame plate 86 has mounted therein three rotatable shafts 88, 90 and 92, the shafts having fixed thereon film feeding sprockets 94, 96 and 98, respectively. The sprockets 94, 96 and 98 are adapted to fit a film strip 100 which is provided with the usual sprocket holes at the longitudinal marginal edges thereof. A film take-up spool 102 is provided for the film, this spool being mounted on a rotatable shaft 104. The film feed is effected from a spool 106 mounted for rotation on a spool shaft 108 upon energization of successive deenergization of a film feeding solenoid, as shown in the above Bryce patent. A spring pressed lever 140 rests in contact with film on the supply spool 106, and when the film on the supply spool is substantially exhausted, the lever 140 will swing to a position in which contacts 142 are permitted to open. Opening of the contacts 142 breaks the machine control circuit and terminates machine operation.

A housing plate 144 provides support for a lens 146 and an associated shutter mechanism, as more particularly shown in the above noted Bryce patent. The lens and shutter assembly is adjusted for so-called bulb exposure operation, the same being normally open during recording and being adapted for closure when the camera unit is removed from the recording section.

It will be seen from the following description that data may be recorded on the film 100 under control of record material passing through the record handling and analyzing section 10. It has been stated that the drum 62 is rotated in synchronism with the passage of a source record through the record handling and recording section 10 and that the lamps 58 are fired at differential times under the control of a hole at an index point position in the record as it passes under the sensing brushes B–2. The recording device, as very briefly described to this point, may be used effectively for the photographic recording of variable data appearing on source records passing through the record handling and sensing section, and it is the object of the invention to provide means in such recording mechanism for the recording of fixed data on the photographic film independently of or concurrently with the recording of variable data on such film under the control of the record source. Accordingly, there has been disclosed herein two ways of achieving the recording of fixed data, either while variable data is being recorded on the record film or independently of such variable data recording.

Figure 3:
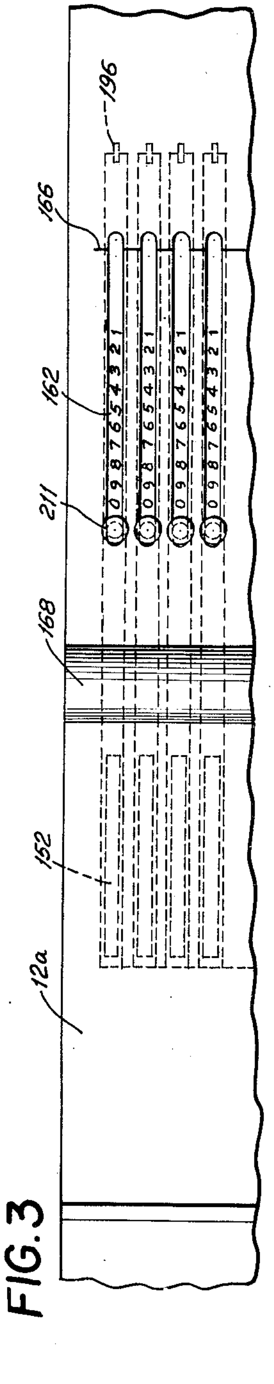
Fig. 3 is a fragmentary plan view of the recording section showing a plurality of manually settable data slides.
Figure 5:
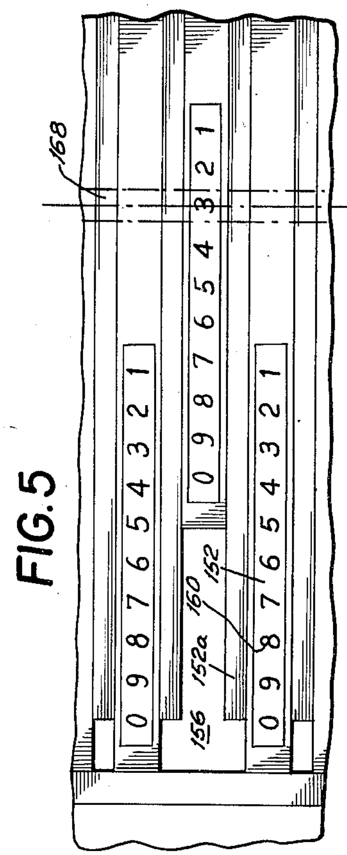
Fig. 5 is a fragmentary view showing the transilluminatible character end of a plurality of manually settable data slides wherein one slide has been displaced into recording position, the cover plate being removed to show the slide structure.
Figure 4:
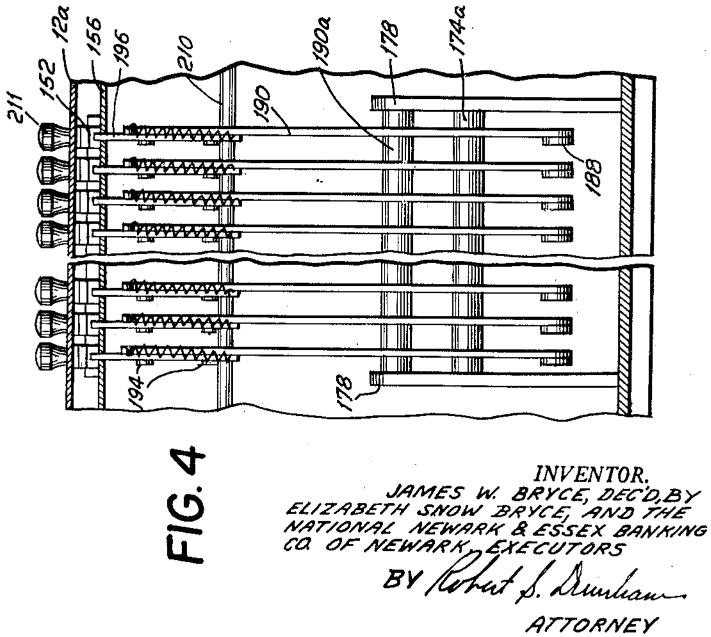
Fig. 4 is a fragmentary vertical sectional view on line 4—4 of Fig. 2.

One form of fixed recording mechanism is shown in Fig. 2 of the drawing wherein a lamp 150 is positioned transversely of the recording section 12, and wherein the lamp 150 is adapted to transilluminate data characters in one or more manually settable character slides 152. As best seen in Figs. 3, 4 and 5 of the drawings, there are provided a plurality of aligned data slides 152, and while these slides are mutually independent of each other, they are adapted for longitudinal adjustment in parallel relation within a slide compartment 154 formed between the top plate 12*a* of the recording section and a slide supporting plate 156, which is fixed in spaced relation to the top plate 12*a*, and which is separated therefrom by a spacer 158, providing a slide compartment which snugly embraces the top and bottom faces of the slides 152. The slides are separated from each other by separating members 152*a*.

Each of the slides 152 has formed in one end thereof a plurality of transilluminatible characters 160 which are representative of units of desired data to be recorded on the photographic film. The opposite end of each slide has corresponding index characters 162 in the upper face thereof, and these characters are visible through slots 164 in the section plate 12*a*. This arrangement is provided to facilitate adjustment of the slides 152 with relation to an index line 166 (Fig. 3). It is to be observed that the characters 162 that are visible through the slot 164 bear such relation to the transilluminatible characters 160 at the opposite end of the slide that when a selected one of the index characters 162 is brought into alignment with the index line 166, a corresponding transilluminatible character 160 is positioned over a transilluminating slot 168 formed in the character support plate 156. It will be observed that the lamp 150 is enclosed in a shield 168 which effectively concentrates the rays of the lamp 150 downwardly through a light slot 170 over which the light 150 is positioned.

It follows, therefore, that when one or more of the slides 152 are operated to align transilluminatible characters 160 thereof with the transilluminating slot 168, such slides will be in a position for transillumination by the rays of the lamp 150.

It is of course necessary to provide an optical system for the projection of rays from the lamp 150 through the lens 146 and against the film 100. To this end there has been provided in conjunction with each data slide a mirror 172 which may be positioned in the path of transilluminating rays passing through the translucent data characters 160 for reflecting such rays into the lens 146. Accordingly there are provided a plurality of mirror supporting toggle links 174 spaced from each other by spacing collars 174*a*. Since the links, their mounting and operation are all the same, a description of one such link and its associated mechanism will suffice.

The mirror 172 is adjustably mounted at the free end of the toggle link 174 and the link is mounted for rocking movement about a bearing shaft 176. The bearing shaft is fixed at its opposite ends in the side plates 178 of a supporting frame. Clockwise movement of the toggle link 174 is limited by a stop member 180 which is fixed in the path of a stop screw 182. The stop screw 182 may be adjusted to regulate the upper limit into which the toggle link 174 may move. Counterclockwise movement of the toggle link is under the control of a spring 184 which has one end thereof attached to the toggle link and the other end thereof to a stud 186 which extends forwardly from the toggle link supporting frame. The spring 184 holds its related link in a depressed position where the same will be below the line of rays projected from the drum lamps 58, thereby permitting record controlled recording to proceed without interference with respect to all columns in which the fixed data recording mechanism is inactive.

One arm of the toggle link 174 is pivoted to a connecting link 188 which in turn is pivoted to an operating lever 190. The operating lever is mounted for rocking movement about a bearing shaft 192 which has its ends fixed in the end plates 178 of the supporting structure. The operating levers 190 are spaced from each other by spacing collars 190*a*. The upper free end of the operating lever 190 has a pair of headed pins 194 extending from one face thereof, and these pins are adapted to guide a contact finger 196 in sliding movement longitudinally of the operating lever 190. The contact finger 196 has a pair of slots 198 through which the pins 194 extend and which permit the contact finger to slide along the operating lever 194 for a limited distance. The contact finger 196 provides a firm, yielding contact between the lever 190 and one end of the operating lever portion of its related data slide 152, as will appear more particularly hereinafter. The yielding character of the contact finger 196 is provided by means of a tension spring 200 which has one end thereof attached to an outwardly extending ear 202 formed at the lower end of the contact finger 196 and the other end thereof to an outwardly extending ear 204 formed in the upper free end of the operating rod 190. The contact finger 196 is sufficiently long so that its upper free end extends into a slot 206 which is formed at the end of the slide compartment 154.

By reference to Fig. 2 of the drawing, it will be seen that the upwardly extending free end of the contact finger 196 normally lies in close proximity to the rear upwardly beveled end 208 of its related data slide 152. It will follow from the foregoing, therefore, that when the operator seizes the nob 211 of any one of the data slides 152 and moves the same rearwardly, the free rear beveled end 208 of the slide will contact the upwardly projecting free end of the contact finger 196 which is related thereto and thereby move the contact finger and its associated operating rod 190 rearwardly or in a clockwise direction as viewed in Fig. 2 of the drawing. This will swing the operating lever 190 about the bearing rod 192 with the result that the connecting link 188 will move the toggle link 174 in a clockwise direction about the bearing rod 176, thereby positioning the mirror 172 for reflecting transilluminating rays from the lamp 150 to the camera unit links 146. The yielding lost-motion connection of the contact finger 196 permits the unrestrained motion of the character slide 152, yet maintains the contact between the lower surface of the character slide and contact finger quite firmly.

Counterclockwise movement of the operating rod 190 is limited by a stop bar 210. The adjusted position of each data slide 152 is yieldingly maintained by contact between an associated spring detent 212 and one of a plurality of notches 214 formed in the lower face of the slide.

As hereinabove indicated, there are a plurality of data slides 152, and it is to be noted that a mirror mounting and positioning linkage is provided for each of the character slides so that upon adjusted transilluminating position of any of the character slides, its related mirror 172 is positioned to reflect the transilluminating rays passing through the characters 160 and project such rays into the lens 146.

A full understanding of the parallel arrangement of the mirror mounting and operating linkage may be gained by reference to Fig. 4 of the drawings, which is a cross-sectional view on the line 4—4 of Fig. 2 and which shows a plurality of data slides 152 in conjunction with a plurality of respectively related mirror mounting and operating linkage systems.

It will follow from the foregoing, therefore, that if it is desired to record onto the photographic film 100 certain fixed data, as for example, a number, and assuming that the data slides 152 have provided therein transilluminatible numbers 160, it is merely necessary to shift those slides corresponding to columnar positions in which recording on the film is desired until the corresponding index character 162 is in line with the index mark 166. When an index number 162 on the rear face of the character slide is in registration with the index line 166, the corresponding number at the front end of the character slide will underlie the lamp 150 and overlie the transilluminating slot 168. The rearward shifting of the selected slides at the same time will operate the mirror mounting and positioning linkage system related thereto, whereby the mirrors are positioned for reflecting the transilluminating rays into the lens of the camera unit without further adjustment.

Figure 1:
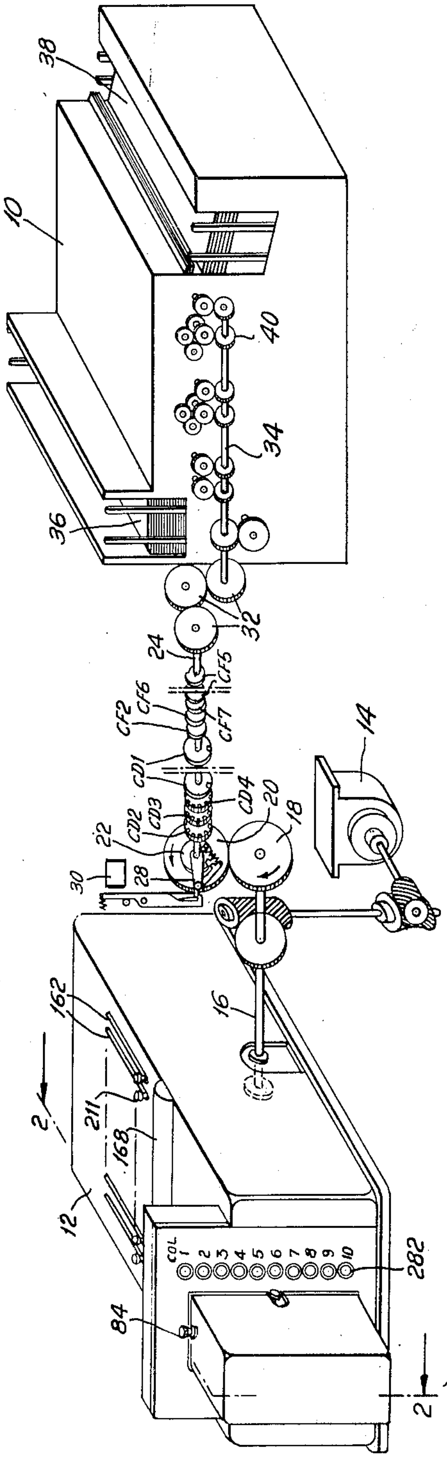
Fig. 1 is a perspective view of the machine in which the invention is embodied.

It is to be understood that an appropriate circuit maker CD–4 (Fig. 1) adapted to make a circuit at each machine cycle is in the circuit of the lamp 150, and that the lamp is accordingly flashed at each cycle point whereby the fixed data, determined by the adjustment of the slides 152, will be reproduced in each line of the photographic film 100. The flashing circuit for the lamp 150 will, of course, be adjusted to flash in proper timed relation whether the lamp is illuminated at each cycle or at any other predetermined spaced intervals.

The mirrors 172 must be equidistant from the surface of the character drum 62. This necessity follows from the fact that the lens 146 is of a fixed focal length, whose focal distance is the distance from the center of the lens 146 to the diameter of the drum 62. It is also a convenience that the lamp 150 is illuminated just slightly after illumination of any of the drum lamps 58. This arrangement is desirable to prevent any possible interference by the light from the lamp 150 with the exposure function of the drum lamps 58.

Figure 6:
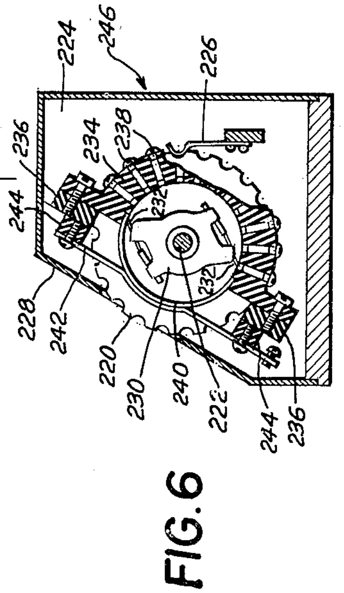
Fig. 6 is a cross-sectional view of a manually settable data retaining device suitable for controlling the recording of fixed data on the recording film.

The control of the recording operation by means of the circuit arrangement shown in Fig. 7 of the drawings requires the use of manually settable data retaining devices such as shown in Fig. 6 of the drawings, and shown in greater particularity in the U. S. Patent No. 2,307,100 to R. T. Blakely. With particular reference to Fig. 6 of the drawings, it may be seen that the manually settable control device may consist of a plurality of number wheels 220, rotatably mounted on a shaft 222 which is supported by frame plates 224. The wheels 220 may be made of some form of molded composition such as "phenol resin." Each device has as many wheels as the number of digits in the largest number that is to be introduced into the machine. Each wheel 220 is notched at intervals to facilitate turning the wheels by hand and also, in cooperation with a detent spring 226, to hold the wheels in set position.

The faces of the projections formed as a consequence of the notches in the peripheral surface of the wheels are engraved, embossed or otherwise suitably marked with data designations such as, for example, numbers 1 through 9 and zero. The wheels are housed in a casing 228 which is provided with slots in the face thereof from which the wheels 220 project to permit them to be turned.

Secured to the side of each wheel 220 is a brush holder 230 of conducting material having two diametrically opposite brushes 232. Associated with each wheel is an arcuate member 234, preferably molded of plastic insulating material, the member being secured to two support bars 236 extending parallel with, and on opposite sides of the shaft 222. Each of the members 234 has a series of commutator segments 238 having the same angular spacing relative to the shaft 222 as the projections on the wheels 220. Brush holders 230 are secured to the wheels 220 in such relation that one of the brushes 232 for each wheel will bear on the correspondingly designated segment 238 when the associated wheel is manually set to bring a given numeral on the wheel in registration with an index line on the face of the housing. Thus, if a wheel 220 were, for example, set at "6", one of the associated brushes 232 will bear on the "6" segment.

Associated with each row of segments 238 and on the opposite side of the shaft 222 is a separate semi-circular common contact strip 240. The latter is secured at its ends by means of clamping strips 242 individual to each contact strip 240. The clamping strips are secured at their ends to bars 244 of insulating material. When one brush 232 of a pair is resting on any one of the segments 238, the other brush rests on the associated contact strip 240. Thus, each denominational order on the selector device comprises a wheel 220, a pair of brushes 232, a row of segments 238 and a common contact strip 240, each such combination being designated in the control diagram by the reference numeral 246. As shown in the wiring diagram of Fig. 7, the common contact strips 240 are connected to the outlet plugs 250, which in turn are plug connected to the inlet plugs 252 of the relays E. The several segments 238 are connected to the corresponding segments of the timing commutator CD–3, which in turn is energized from the card sensing circuit. The timing commutator CD–3 is driven in synchronism with the movement of cards under the sensing brushes B–2, so that a circuit is completed through a selector commutator strip when a hole of a record card is encountered at the index point position for which the particular selector wheel is set. The more particular operation of the control mechanism will be more fully described when the control circuit of Fig. 7 is dealt with in particularity.

Before the machine is placed into operation for recording, it is necessary to make certain plug connections. The plug hubs 250 of the data storage devices 246 are connected to the plug hubs 252 of relay coils E. It will be understood in this regard that the number of storage devices 246 that are plug connected will be determined by the amount of fixed data to be recorded on the recording film. Furthermore, it may be noted that the plugging from the plug hubs 250 to the plug hubs 252 determines the columnar position on the film in which the fixed data is recorded.

Further plug connections are made from the sensing brush outlet hubs 254 to the inlet hubs 252 of the relays E. Here again the number and position of the plug connections will be determined by the amount of data to be recorded from a record source, and also by the position such data is to occupy on the recording film. It will be understood that a relay coil E is provided for each column of recording, but for simplicity in the circuit diagram only three of such coils have been shown. The circuits which will be made through the coils E are the sensing circuits to be closed by sensing of character designations in the source record, and such sensing controls the recording of the data on the recording film. The current supply for the sensing circuits is at relatively low line voltage. On the other hand, in the present machine it is contemplated to use neon tubes which are fired with current at a relatively high voltage, and it is desirable that the high voltage circuits be isolated from the sensing circuits. Accordingly, the relay coils E are utilized, these being energized under line voltage applied through the card sensing circuits. The relays E in turn are utilized to connect the neon tubes to receive high voltage current and to be fired for recording as will be subsequently explained.

The opposite terminals of each neon tube 58 are connected to plug sockets 254 and 256. A plug connection is made from the tube socket 256 to a socket 258, and another plug connection is made from the tube socket 254 to a socket 260. It will be understood that as many neon tubes are utilized as are necessary for the required number of columns to be recorded. In practice, there is one neon tube for each column of characters upon the character drum, and while only three neon tubes have been shown in the circuit diagram for simplicity of illustration, it will be appreciated that as many such tubes are provided as may be required. Further plug connections are made from a socket 262 to a socket 264. The latter plug connections are in the charging circuit of condenser banks K, one of which is associated with each neon lamp 58.

It has been mentioned that exposure of data from the character drum 62 is effected by flashing the neon tubes at the proper differential time. The neon tubes require considerable voltage to flash or fire them. In order to provide such voltage, according to the present invention, use is made of the condenser banks K. In general, it may be stated that the condensers are charged from the relatively low voltage direct current supply line with the condensers of each bank connected in parallel. Accordingly, each condenser of the bank will be charged to approximately the line potential of the direct current supply. After the condensers are thus charged, and before a recording operation takes place, provision is made for reconnecting the condensers of each bank in series relation. In the condensers connected serially, a high potential is available for firing the related neon tube.

It will be further appreciated that if a neon tube associated with a drum column should fail to fire for any recording operation, the result would be failure of exposure of recording film at the particular column for which the lamp failed. With such tube failure many lines of film might be unexposed, and such unexposure would be discovered only after development and inspection of the film unless provision is made for the immediate notification of tube failure. There is, therefore, provided herein means for indicating tube failure immediately after such failure. While this indicating means will be subsequently described in greater detail, its general principle of operation may be mentioned here. If a particular neon tube fails to fire during a recording cycle, its related bank of firing condensers will retain a charge after the recording operation. This retained charge is utilized to energize a testing relay. If during a testing cycle such testing relay becomes energized by virtue of a residual condenser charge, an indicating lamp related to the particular column of undischarged condensers is illuminated, and a control circuit is energized which is effective to halt machine operation. Since the operator is apprised exactly as to which neon tube has failed to fire, it is a relatively simple matter for him to replace the faulty tube or otherwise rectify the condition responsible for failure of tube operation.

When cards are fed through the sensing device, such as shown in the above identified Bryce patent, they will pass between a contact roller 42 and its associated brushes B–2 (Fig. 6), and at the same time such cards will contact a card lever and close card lever contacts 44. Upon closure of the card lever contacts 44, a coil N is energized, closing contacts N–1. At the beginning of the sensing cycle, a charging circuit is established to the condenser banks K, as explained before. With the card lever relay contact N energized, relay contacts N–3 are closed, and a circuit is established from the line 266 through the closed N–3 relay contact, through a commutator timer CD–1, to a line 268, thence through a resistor in parallel, through the normally closed switching contacts R–2 and the several condensers of the condenser bank K, thence out through the normally closed switching contacts S–2 to a line leading to the plug socket 262, and thence by way of the plug socket 264 to the opposite side of the line 270. As soon as the several sets of condensers are charged, their connections are reversed from their parallel charging relation to a series relation. Closure of the cam contacts CF–6 establishes an energizing circuit for relays R and S. When relays R and S are energized, the contacts R–1 and S–1 close. With the latter contacts closed, several condensers of each bank are connected in series relation. There is a timing commutator CD–1 for each condenser bank, and all of the banks which have been connected to line 270 through plugging of the sockets 262 and 264 are concurrently charged.

The relay coils E are energized under control of the brushes B–2 insofar as the recording of variable data from a control record source is concerned, and under control of the data storage devices 246 insofar as the recording of fixed data is concerned. Relays E are energized from the sensing brushes B–2 as the brushes encounter character designating perforations in the record source columns from which recording is desired. The circuits are from the line 270, through the N–4 and CF–7 contacts, through the common brush 42a, through the contact roll 42, thence through the brushes B–2, through the connections between the plugs 254 and 252, through the relay coils E and back to the line 266. It will be understood that the relays E are energized at differential times in accordance with the differential positions of the holes in the control records. Relay coils E energize only momentarily, but upon energization they close their related E–1 contacts. With the E–1 contacts closed, a tube firing circuit or circuits are established as will now be described.

A tube flashing circuit will extend from the right hand terminal of the lowest condenser in a condenser bank K, for example, the left hand bank in Fig. 6 of the drawings, through the condenser, thence through the lead which extends to the second S–1 contact from the bottom of the now closed S–1 contact, then through the next condenser and so on in succession, in series through the several condensers and the related S–1 contacts, finally through the uppermost condensers, through the now closed R–1 contacts, through the plug connection between plug sockets 258 and 256, thence through the neon lamps 58, through the plug connections between the sockets 254 and 260 by way of the downwardly extending lead, through the now closed E–1 contacts, through a timing commutator CD–2, through a lead 272, back through a resistor 274, through the lowest S–1 contact and back to the starting point. The condensers are discharged through their related neon lamps when the same are connected in series relation.

The commutator CD—2 closes the lamp circuit only momentarily, but such closure is sufficient to illuminate the desired neon lamp and effectively transilluminate a character of a character drum column, thereby exposing the film at the exposure station. Herein the circuit for a single lamp has been traced, and it is to be understood that the circuit for all other lamps in the system are similar.

It will be understood that the related character on the character drum is at the transilluminating position at the time the neon tube related to the particular column in which the character appears is illuminated under control of the corresponding index point in the record card and the commutator contacts CD—2 close for a short period of time in which such index point is being sensed. The character selected by the designations in the record card columns can thus be exposed and recorded at differential points of the cycle, and such exposure for different columns may occur either concurrently or at different differential times, depending on whether like or unlike designations are sensed in the card columns. Exposure of characters in different columns during a card cycle will, however, be effected on a common line on the film.

As hereinabove suggested, provision is made for detecting neon tube failure. If a tube fails to fire, a residual charge will remain in the related bank of condensers. Before testing is effected, relays R and S are deenergized by opening of the cam contacts CF–6. Accordingly, contacts R–2 and S–2 resume the normal position as shown in Fig. 7 of the drawings. Assuming a charge remains in one or more of the condenser banks K, current will flow from the charged condensers through the R–2 contacts, now closed, to the lead 276, thence through the relay contacts N–7, now closed, through the cam contacts CF–5, through the detecting relay coils D, through a resistor 278, through the S–2 contacts to the opposite side of of the charged condensers. The energy in the circuit thus established is sufficient to energize the D coil, closing the related contacts D–2, to establish a circuit through key contacts 280, through an indicating lamp 282, through the D–2 contacts, through the D relay coil, through the resistor 278, through a plug connection from plug hub 262 to a plug hub 264, and back to the line 270. An indicating lamp 282 is provided for each condenser column, and consequently each neon lamp has its related signal lamp. The operator can readily detect which of several neon lamps has failed by the particular signal lamp which is illuminated during the testing cycle. Energization of relay D is adapted to open a related contact causing deenergization of a card feeding clutch and the stopping of further feeding of cards through the card sensing station of the machine as fully described in the above identified Bryce patent. After there has been tube failure, the operator detects which tube is faulty, replaces it and then opens the warning signal circuit by manual operation of the key contacts 280.

After the plug connections have been made between the data storage devices 246 and the relays E by plugging between the exit plugs 250 of the storage devices and the entrance plugs 252 of the relays E, the settable hand wheels 220 are set at the desired readings. Circuits are established through the data storage devices 246 by way of the common brush 42a, a lead 284, to the common side of the commutator CD–3, thence through the hand settable brushes of the storage devices 246, to plug hubs 250, through plug hubs 252, and to the pick-up relay coils E and finally to the line 266.

The commutator brushes of the commutator CD–3 are rotated while the segments of the commutator remain stationary. The segments of the commutator CD–3 are wider and contact slightly before corresponding segments on the commutator CD–2. This allows relay coil E time to pick up its points so that the actual firing of the circuit is done by the commutator CD–2. The current supply for the sensing brushes B–2 is at relatively low line voltage while on the other hand, as hereinabove described, the neon tubes are fired at a relatively high voltage. It is, therefore, desirable that the high voltage circuits be isolated from the sensing circuits. Accordingly, the relay coils E are utilized, these being energized under line voltage applied through lead 284 by way of the common brush 42a. As hereinabove noted, the relays E in turn are utilized to connect the neon lamps to receive high voltage current and to be fired, thereby, for recording purposes.

The invention has been described herein in two operative embodiments, and what is claimed as new and patentable will be defined in the claims that are to follow.

What is claimed is:

1. In a photographic record responsive recording device, a character screen having columns of characters therein, a lamp for each of the character columns whereby the characters in said screen may be transilluminated, a camera unit having a lens in the path of transilluminating rays of said lamps and means for positioning a photographic film behind said lens, means for moving said film and said character screen in synchronism with the passage of a record card through a record reading device, means under the control of a record card being read for energizing some of said lamps at intervals determined by the position of data on the record card, means for energizing another of said lamps, for transilluminating a character column in said screen other than said previously mentioned columns, and a settable device in the circuit of said last named lamp for predetermining the point in the recording cycle at which said last named lamp is energized.

2. In a photographic record responsive recording device, a rotatable character drum having columns of characters therein, a lamp for each of said columns whereby characters in said drum may be transilluminated, a camera unit having a lens in the path of transilluminating rays of said lamps, means for positioning a photographic film behind said lens, means for moving said film and rotating said character drum in synchronism with the passage of a record card through a record reading device, means under the control of a record card being read for energizing some of said lamps at intervals determined by the position of data on the record card to record variable data on said film, a second group of transilluminatible character columns in said drum, a lamp associated with each of the columns of said second group energizable independently of said first named lamps, an energizing circuit for said second set of lamps, settable devices in the energizing circuit for each of said second set of lamps for controlling the transillumination of said second group of character columns for effecting the recording of fixed data on said film, and means for closing said circuit and energizing said second set of lamps during each recording cycle.

3. In a photographic record responsive recording device, a rotatable character drum having columns of characters therein, a lamp for each of said columns whereby characters in said drum may be transilluminated, a camera unit having a lens in the path of transilluminating rays of said lamps, means for positioning a photographic film behind said lens, means for moving said film and rotating said character drum in synchronism with the passage of a record card through a record reading device, means under the control of a record card being read for energizing some of said lamps at intervals determined by the position of data on the record card to record variable data on said film, a second group of transilluminatible character columns in said drum, a lamp associated with each of the columns of said second group energizable independently of said first named lamps, an energizing circuit for said second set of lamps, settable devices in the energizing circuit of each of said second set of lamps for controlling the transillumination of said second group of character columns for effecting the recording of fixed data on said film, and means for closing said circuit energizing said second set of lamps at a predetermined point in the recording cycle.

ELIZABETH SNOW BRYCE,
THE NATIONAL NEWARK AND ESSEX BANKING COMPANY OF NEWARK,
By LESLIE P. DOUGLASS,
*Trust Officer,*
*Joint Executors of the Last Will and Testament of James W. Bryce, Deceased.*

REFERENCES CITED

The following references are of record in the file of this patent:

UNITED STATES PATENTS

| Number | Name | Date |
|---|---|---|
| 2,158,039 | Wenczler | May 9, 1939 |
| 2,172,330 | Bryce | Sept. 5, 1939 |
| 2,177,135 | Fassel | Oct. 24, 1939 |
| 2,184,546 | Collins | Dec. 26, 1939 |
| 2,355,268 | Bryce | Aug. 8, 1944 |
| 2,490,338 | Selgas et al. | Dec. 6, 1949 |